Nov. 17, 1969

3,540,794

MULTILAYER DIGITAL LIGHT DEFLECTOR

Filed Sept. 4, 1968

INVENTORS
KURT M. KOSANKE
WERNER W. KULCKE
ERHARD MAX

BY John F. Osterndorf

ATTORNEY

United States Patent Office 3,540,794
Patented Nov. 17, 1970

3,540,794
MULTILAYER DIGITAL LIGHT DEFLECTOR
Kurt M. Kosanke and Werner W. Kulcke, Boblingen, and Erhard Max, Sindelfingen, Germany, assignors to International Business Machines Corporation, Armonk, N.Y., a corporation of New York
Filed Sept. 4, 1968, Ser. No. 757,302
Claims priority, application Germany, Nov. 18, 1967, 1,589,980
Int. Cl. G02f 3/00; H03k 19/14
U.S. Cl. 350—150                        11 Claims

ABSTRACT OF THE DISCLOSURE

Apparatus is provided for controllably deflecting a light beam from a source to a desired location on a target. The deflection system may be formed of plural stages with each stage including an element for rotating the plane of polarization of the beam, a non-birefringent succeeding element for deflecting or not deflecting the beam depending on its plane of polarization and a light reflector for accepting the deflected beam to provide it in a path substantially parallel to the path of the non-deflected beam.

BACKGROUND OF THE INVENTION

Field of the invention

This invention relates to light deflecting apparatus and, more particularly, to apparatus utilizing non-birefringent means for accomplishing the deflection of a light beam.

Description of the prior art

Numerous technical applications require that a light beam or light spot be produced in raster or random form on a target. In the past, this problem has been solved with the aid of light spot generators consisting of cathode ray tubes having luminous screens. Other solutions have included the use of electro-optical arrangements for the controllable deflection of a light beam in a multiplicity of discrete amounts.

The arrangements employing luminous screen cathode ray tubes provide for the production of a light raster in television systems for recording and reproducing television pictures. Such tubes are also used for producing written characters by acting as character generators. These arrangements have the disadvantage that the intensity of the light spot cannot be made substantially great. It is limited by the thermic resistance power of the substances employed in the screen. To obtain character generators for use in high speed optical printers delivering ten thousand characters per second substantial expenditures must be made to provide the high intensities required for the light spot in the very brief exposure times. Moreover, on account of the high thermic loading, such generators have only a very brief operating life. Even in the projection of television pictures, the image size transmitted from a luminous screen by an optical system has limitations imposed upon it due to the relatively low thermic loadability of the luminous phosphors presently available.

In order to produce a light spot for scanning or random access of a target for the purpose of presenting pictures, it has already been proposed (application Ser. No. 285,832 filed June 5, 1963 in the names of Harris et al. and assigned to the assignee of this invention) that beam deflectors be employed including a plurality of stages. Each stage is formed of an element for controllably rotating the plane of polarization of a linearly polarized light beam, and of an after-placed double refracting element which passes the light beam either as an ordinary or extraordinary beam, depending upon the plane of polarization. Such arrangements may be used in connection with optical printers or displays as described in Pat. No. Re. 26,170. In the system of that patent, the beam is directed through a first group of deflecting units to select a desired character from a matrix, and after passing through the mask, the character bearing beam is directed by a second group of deflecting units to a desired location on an output record medium.

The above mentioned deflecting devices employ a plurality of double refracting crystals positioned in tandem. The crystals are required to increase in dimension with each succeeding stage. For a deflection system of many stages the crystals are required to be of substantial length. Moreover, the crystal structure regularity requirements of the individual crystal blocks are extremely severe. The result is that such arrangements can only be designed for relatively small scans as crystals with large cross-sections (deflecting cross-sections of several inches may be necessary) either cannot be produced at all, or only with extraordinarily high cost outlay.

It is known from German Pat. No. 899,120 that polarizers may be formed consisting of several parallel layers having differing refraction indices and on which the beam to be polarized will impinge at the Brewster angle.

SUMMARY OF THE INVENTION

As contrasted with the known light deflectors, the light deflection apparatus of this invention provides for the controlled deflection of a light beam in a multiplicity of discrete amounts. It includes several units comprising at least one element for controllably rotating the plane of polarization of a linearly polarized light beam through 90°, and a succeeding nonbirefringent element for deflecting or not deflecting the linearly polarized light beam, depending on the plane of polarization of the beam. The arrangement is characterized by the deflecting elements being formed of a plate having a plurality of parallel transparent layers of differing refraction indices. The normals to these layers enclose with the incident light beam to be deflected an angle which is equal to the Brewster angle of the layers. When the incident beam has a plane of polarization in one direction, it traverses the plate undeflected. When the beam has a plane of polarization rotated at 90° thereto, it is deflected by partial reflection at the individual layers.

According to one embodiment of the invention, a reflecting plate is arranged at a predetermined angle to the multilayer plate. The reflecting plate diverts the deflected beam into a direction substantially parallel to the direction of a non-deflected beam or into a predetermined direction differing therefrom. The spacing between the deflecting and reflecting plates is established to provide a desired amount of displacement of the deflected beam with respect to the non-deflected beam. The reflecting plate may be curved to permit scanning of the beam depending upon the point of incidence.

Another feature of the invention provides for the multilayer plates to be constructed of a sequence of parallel thin plates or wafers which consist alternately of titanium dioxide ($TiO_2$) and silicon dioxide ($SiO_2$). Such plates preferably consist of a plano-parallel glass plate base having a sequence of parallel thin layers of differing refraction indices applied to it by alternately coating with $TiO_2$ and $SiO_2$.

Since it is possible to produce these plates in almost any size and shape at relatively low cost, the arrangement according to the invention is particularly suitable for creating large-area images formed by the stepwise periodic displacement of a modulated light beam or for projecting light spots or certain symbols on a recording medium carrying graphic presentations.

A further feature of the invention provides for the avoidance of interference between the beams provided by the pairs of multilayer and reflecting elements. Compared with deflection units which comprise a pair of plates consisting of a double refracting crystal and a reflecting plate and whose cross-section embraces the whole of all beam positions possible in the area of the particular deflection system, the present arrangement has the advantage that the system length is substantially less. Deflecting arrangements thus constructed only require much smaller reflecting faces as contrasted with arrangements having deflection units consisting of only one reflecting pair. Thus, the deflection system costs are also appreciably lower.

BRIEF DESCRIPTION OF THE DRAWING

The invention will be explained in greater detail below with the aid of the accompanying drawing, in which.

DESCRIPTION OF THE PREFERRED EMBODIMENT

Figure 1:
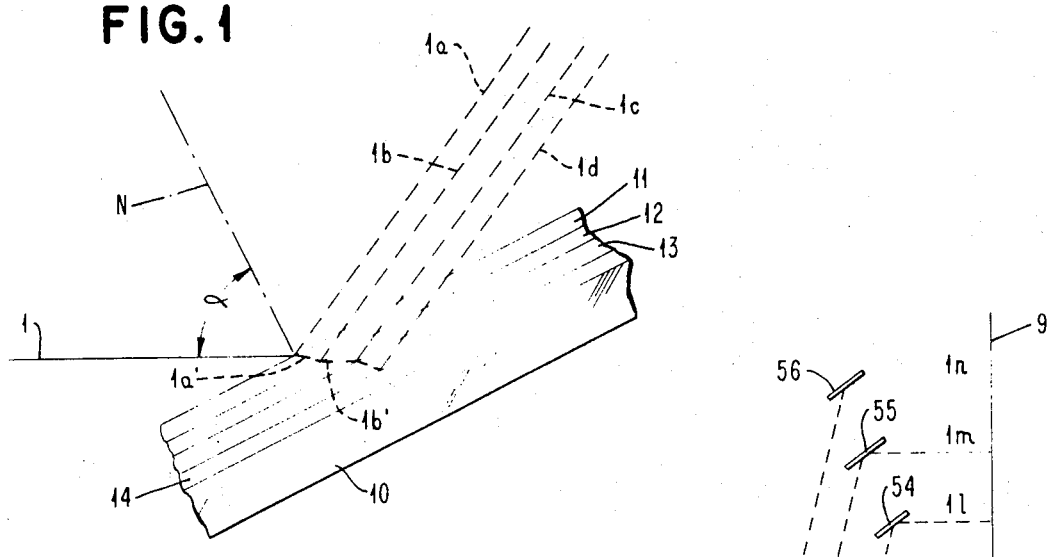
FIG. 1 is a sectional view through a multilayer element employed according to the invention.

The arrangement of FIG. 1 comprises a plano-parallel ground glass plate base 10 upon which there are placed thin layers 11–14. The layers have a thickness preferably related to the wavelength of radiation acted on and may be about 1 micron thick for a conventional laser radiation beam. The layers may consist alternately of titanium dioxide ($TiO_2$) and silicon dioxide ($SiO_2$) deposited on plate 10 by any suitable method such as vaporization. A collimated beam 1 of monochromatic plane polarized light which may be supplied by a source of radiation which is preferably a laser source (not shown) impinges upon thin layer 11. Incidence of beam 1 is at the Brewster angle $\alpha$ for this layer. Angle $\alpha$ is defined by the plane of incidence of beam 1 and the normal N to the plurality of thin layers 11–14. If beam 1 is polarized at right angles to the plane of incidence, a substantial portion is reflected as beam 1a on incidence at layer 11, and the remainder is refracted in layer 11 as beam 1a'. The same percentage of beam 1a', as that percentage of incident beam 1 reflected as beam 1a, is reflected at the front face of layer 12 as beam 1b and the remainder is refracted as 1b'. This process continues with each succeeding one of the thin layers.

If the plane of polarization of beam 1 is parallel to the plane of incidence, the beam passes through the layers 11–14 and plate 10 with substantially no refraction occurring at any of layers 11–14.

This phenomenon is described by the so-called Fresnel equations. From these equations, the two components of the reflected light R (polarized parallel and perpendicular to the plane of the incident light beam) are obtained:

$$R_{(Parallel)} = \frac{\tan^2(\alpha-\beta)}{\tan^2(\alpha+\beta)} \quad R_{(Perpendicular)} = \frac{\sin^2(\alpha-\beta)}{\sin^2(\alpha+\beta)}$$

and for the components of the transmitted light T $$T_{(Parallel)} = \frac{\sin\alpha \cdot \sin\beta}{\sin^2(\alpha+\beta)\cos^2(\alpha-\beta)} \quad T_{(Perpendicular)}$$

$$= \frac{\sin\alpha \cdot \sin\beta}{\sin^2(\alpha+\beta)}$$

wherein $\alpha$ is the angle of incidence and $\beta$ the angle of refraction of the light. The relationship between the angles of incidence and refraction is:

$$n_1 \sin\alpha = n_2 \sin\beta$$

where $n_1$ and $n_2$ are the indices of refraction of the entering medium and the refracting layer.

For $\alpha$ equal to the polarization or Brewster angle $(\alpha+\beta)=\pi/2$ the result is that R(parallel)=0, and linearly polarized light is obtained in the reflected beam. The reflected beam is polarized at right angles to the plane of incidence. The refracted beam is partially polarized and the intensity ratio I between the two components, after passage through a plano-parallel plate is:

$$\left(\frac{T_{Parallel}}{T_{Perpendicular}}\right)^2 = \sin^4 2\alpha = \left(\frac{2n}{1+n}\right)^4 = I$$

For $n=1.5$, the intensity ratio under these conditions is:

$$I=0.73$$

This intensity ratio may be increased by allowing the light to pass through several layers. For example, for a series of eleven (11) layers in air and arranged at the Brewster angle of polarization we get:

$$I=(0.73)^{11}=3 \cdot 10^{-2}$$

Figure 2:
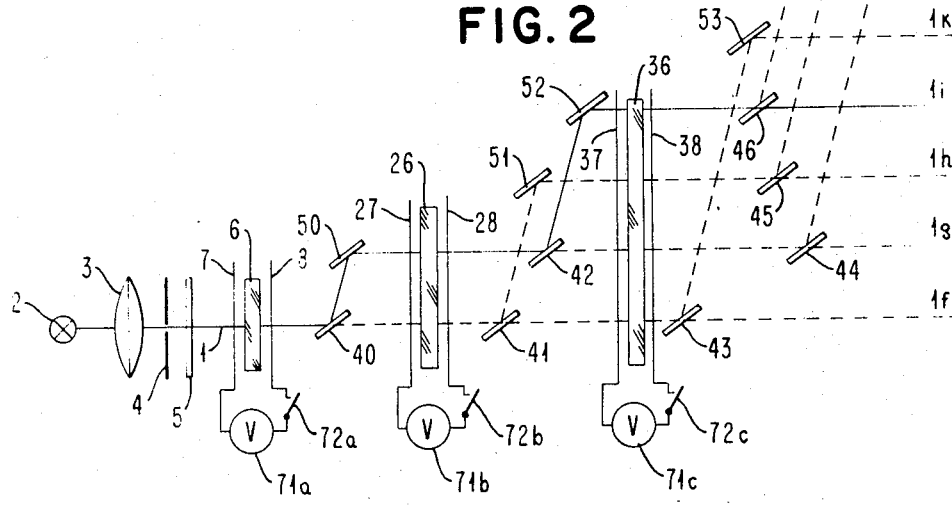
FIG. 2 is a schematic presentation of an arrangement comprising individual deflecting elements according to the invention.

A multistage light deflector according to the invention is shown in FIG. 2. A monochromatic light source 2 which may take the form of a laser provides a beam of light 1. Lens 3 collimates beam 1 and directs it through a shutter 4 which is operable when activated to prevent the passage of beam 1. A polarizer 5 linearly polarizes beam 1 in a plane parallel to the plane of the paper. Beam 1 is deflected to a selected location as one of the beams 1f–1n on target 9.

Each stage of the deflector comprises an electro-optic switch 6, 26 and 36, in the form of crystals which may be potassium dihydrogen phosphate (KDP) crystals. Each crystal is provided with a pair of electrodes 7, 8; 27, 28; 37, 38. The electrodes are connected through switches 72–72c to voltage sources 71a–71c. Electro-optic switches 6, 26 and 36 act either to leave the plane of polarization of beam 1 unchanged or when activated through its associated switch 72a–72c to rotate the plane of polarization through 90°. The operation of such switches is well known in the art. If a switch is closed a voltage is applied across the associated crystal that is equal to the half-wavelength voltage for the particular crystal. The crystal then acts to rotate the plane of polarization of the light beam incident on it to a direction perpendicular to the plane of the paper.

Each stage also comprises multilayer elements 40, 41–42 and 43–46 and the reflecting elements 50, 51–52 and 53–56. The multilayer elements are of the type described in connection with FIG. 1. The reflecting elements are mirror surfaces operative to redirect a deflected beam from an associated multilayer element into a path substantially parallel to the path taken by a beam that is not deflected by a multilayer element. The spacing between a multilayer element, for example 40, and its associated reflecting element, for example 50, is selected to provide a predetermined displacement between the path taken by a reflected beam and a non-deflected beam.

In operation, if it is considered that the switches 72a and 72c are closed so that the half-wavelength voltages for the crystals 6 and 36 are applied across them through the electrodes 7, 8 and 37, 38, the path of travel of beam 1 can be directed through the deflector. Electro-optic crystal 6 rotates the plane of polarization of beam 1 by 90°. It is incident on multilayer element 40 in a manner such that it is deflected to the reflecting element 50. Electro-optic crystal 26 is inactive, however the beam redirected from element 50 has a plane of polarization that is perpendicular to the plane of the paper when incident on multilayer element 42. Thus, it is also deflected by element 42 to reflecting element 52. If electro-optic crystal 36 is activated, it rotates the plane of polarization of the beam redirected by element 52 to the plane of original polarization, that is a plane parallel to the plane of the paper. The beam is incident on multilayer element 46 and as the plane of polarization of the beam is parallel to the plane of the paper, it is transmitted through element 46 to appear as beam 1i at target 9. It is apparent that by suitably activating any one or all of the switches 72a–72c an output beam may be provided as any one of the beams 1f–1n.

Another embodiment of the invention provides for the use of a single multilayer element, for example 60, to accommodate more than one possible beam emitted from the electro-optic crystals of the same stage. Thus, element 60 accepts the beam transmitted through element 40 as well as the beam deflected by element 40 and reflected at element 50 after passage through electro-optic crystal 26. Similarly, reflector 61 accommodates both beams that may be deflected at element 60 and redirects them into paths substantially parallel to the transmitted beams to provide one of the four possible output beams 1f–1i from the two stage deflector of FIG. 3. The arrangement of individual multilayer elements and reflectors of FIG. 2 provides for a substantial reduction in the mounting depth required by the deflector stages. The length of a deflector according to the arrangement of FIG. 2 is substantially less than the length of a deflector according to FIG. 3.

It is also apparent that although a single electro-optic switch is provided in each stage to accommodate all possible beams incident on it, it is also possible to employ individual polarization rotating elements. Each element would accept a single beam and act to rotate its polarization or leave it unaffected. These individual rotators could be provided with comon drive circuits or they could be operated independent of one another.

Figure 3:
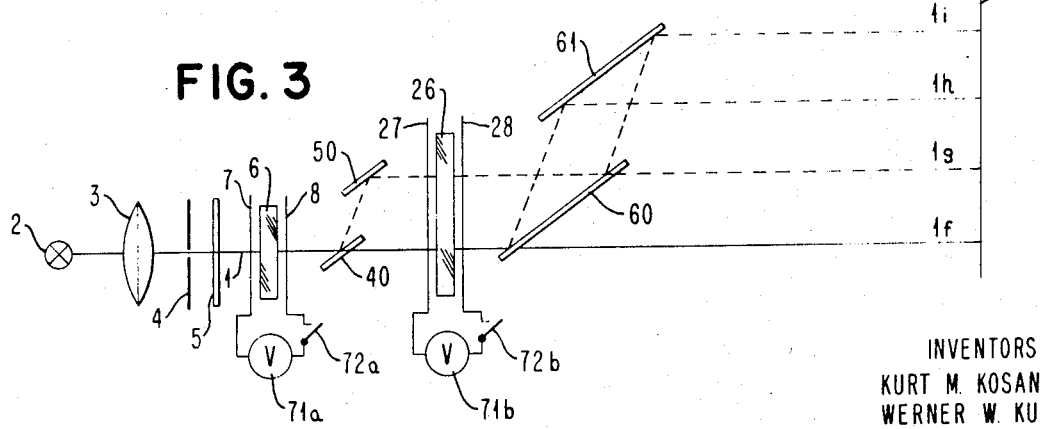
FIG. 3 is a schematic presentation of a deflecting arrangement according to the invention, in which each deflecting unit is provided with a plate pair consisting of a multilayer plate and a reflecting plate.

The embodiments of the deflectors of FIGS. 2 and 3 enable deflecting systems to be constructed for deflecting a light beam to any one of a plurality of output positions on a suitable target over individual deflection paths at considerably lower construction cost than has heretofore been possible in light deflectors using double refracting or birefringent crystals. It is also possible to construct light deflectors providing lateral deflections of a light beam that are considerably greater than those obtainable with the birefringent type of light deflector. As is well known, it is difficult to produce birefringent crystals having dimensions greater than a matter of inches. The appartus according to the invention provides for a deflection system wherein the light losses due to traversal of electro-optical elements and deflecting elements are substantially less than those obtainable with birefringent type light deflectors.

In the case of light deflectors employing electro-optic crystals, the length of the deflection path depends substantially upon the length of the birefringent crystal. In order to obtain deflection paths greater than a few inches it is necessary to employ multiple numbers of tandem connected birefringent crystals of which the length dimensions of these crystals must amount to a multiple of the crystals of the preceding stages and of the entire deflection path. Some light absorption occurs in this long light path through the crystals when birefringent crystals are used, diminishing the intensity of the possible output beams over that obtained by the light deflection systems of this invention which rely on the reflection laws of Brewster.

Although the light deflection apparatus of this invention has been described as providing light deflection along a vertical axis only, it is readily understood that the apparatus can operate along a horizontal axis simply by rotating the system 90°. In like manner, it is understood that the light deflection apparatus is capable of providing a matrix of possible output beams by employing a light deflector operating on a vertical or y axis followed by a light deflector operating along a horizontal or x axis.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A light deflector for interposition between a source of a beam of plane polarized light and a target to deflect the beam to a selected position in the target, comprising:
   means for rotating the plane of polarization of the beam of light transmitted therethrough into one of two mutually orthogonal planes,
   multilayer isotropic means disposed in the path of the beam of light following the rotating means and positioned with respect to said beam at the Brewster angle for such means for transmitting therethrough a beam having a polarization in one plane and for reflecting a beam having a polarization in the orthogonal plane, and
   means displaced from the path of the incoming beam of light for accepting the reflected beam to redirect it into a predetermined path with respect to the path of the transmitted beam.

2. The light deflector of claim 1, wherein the multilayer isotropic means is formed of plural transparent parallel layers of differing refractive indices such that the beam with the polarization in said one plane traverses the layers substantially undiffracted and the beam in said orthogonal plane is reflected at the individual layers.

3. The light deflector of claim 2, wherein the displaced means is arranged parallel to the plural layers in order to divert the reflected beam into a path parallel with respect to the path of the transmitted beam, the displacement between the displaced means and the plural layers being related to the displacement between the reflected and transmitted beams.

4. A light deflector for interposition between a source of a beam of plane polarized light and a target to deflect the beam to a selected position in the target, comprising:
   a plurality of optically aligned cascaded beam deflecting stages, each stage comprising in the order of the incoming beam of light,
   means for rotating the plane of polarization of the beam of light transmitted therethrough into one of two mutually orthogonal planes, and
   multilayer isotropic means disposed in the path of the beam of light following the rotating means and positioned with respect to said beam at the Brewster angle for such means for transmitting therethrough a beam having a polarization in one plane and for reflecting a beam having a polarization in the orthogonal plane, and
   means displaced from the path of the incoming beam of light for accepting the reflected beam to redirect it into a predetermined path with respect to the path of the transmitted beam.

5. The light deflector of claim 4, wherein the multilayer isotropic means of each stage is formed of plural transparent parallel layers of differing refractive indices such that the beam with the polarization in said one plane traverses the layers substantially undiffracted and the beam in said orthogonal plane is reflected at the individual layers.

6. The light deflector of claim 5, wherein the displaced means of each stage is arranged parallel to the plural layers in order to divert the reflected beam into a path parallel with respect to the path of the transmitted beam, the displacement between the displaced means and the plural layers being related to the displacement between the reflected and transmitted beams.

7. The light deflector of claim 6, wherein the multilayer isotropic means for each stage after the first comprises a single plural layer device for acting on all of the beams provided from the preceding stage.

8. The light deflector of claim 6, wherein the multilayer isotropic means for each stage comprises individual plural layer devices, each such device acting on a single incoming light beam.

9. The light deflector of claim 7, wherein the displaced means of each stage after the first comprises a single reflecting device for diverting all of the reflected beams of light of that stage in paths parallel to the paths of the transmitted beams and the other reflected beams.

10. The light deflector of claim 8, wherein the displaced means of each stage comprises individual reflecting devices each such device acting on a single reflected beam of light to divert it into a path parallel to the paths of the transmitted and the other reflected beams.

11. A light beam deflection system for interposition between a source of a beam of plane polarized light and a target to deflect the beam to a selected position in the target under the control of digital signals, comprising
  a plurality of aligned cascaded beam deflecting stages each having in the order of the incoming beam of light,
  means responsive to the digital signals for rotating the plane of polarization of the beam of light transmitted therethrough into one of two mutually orthogonal planes, and
  multilayer isotropic means disposed in the path of the beam of light following the rotating means and positioned with respect to said beam at the Brewster angle for such means for transmitting therethrough a beam having a polarization in one plane and for reflecting a beam having a polarization in the orthogonal plane, and
  means displaced from the path of the incoming beam of light for accepting the reflected beam to redirect it into a predetermined path with respect to the path of the transmitted beam, and
  in which the plurality of aligned cascaded beam deflecting stages include a first plurality of stages in which the multilayer isotropic means and the displaced means have orientations providing deflections along a first common coordinate.
  said plurality of beam deflecting stages including a second plurality of stages in which the multilayer isotropic means and the displaced means have orientations providing deflections along a second common coordinate orthogonal to said first coordinate.

References Cited

UNITED STATES PATENTS 3,026,763  3/1962  Marks _____ 350—152
3,401,593  9/1968  Altman _____ 350—152 X

FOREIGN PATENTS 532,679  2/1958  Belgium.

OTHER REFERENCES

Sokolova et al. "Interference Polarizers for the Ultraviolet Spectral Region" Optics and Spectroscopy vol. XIV, No. 3 (March 1963) pp. 213–215.

Habegger et al. "Total Internal Reflection Light Deflector" Applied Optics vol. 5, No. 9 (September, 1966) pp. 1403–1405.

DAVID SCHONBERG, Primary Examiner

P. R. MILLER, Assistant Examiner

U.S. Cl. X.R.
350—152